United States Patent
Ramirez et al.

(10) Patent No.: US 9,751,634 B2
(45) Date of Patent: Sep. 5, 2017

(54) ASSISTANCE SYSTEM FOR THE IMPLEMENTATION OF AIRCRAFT PROCEDURES COMPRISING A CHAIN OF OPERATIONS TO CARRY OUT, AND RELATED PROCESS

(71) Applicant: DASSAULT AVIATION, Paris (FR)

(72) Inventors: Bruno Ramirez, Le Chesnay (FR); Gilles Constant, Le Pecq (FR); Gaëtan Bramoullé, Martignas sur Jalle (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 15/060,815

(22) Filed: Mar. 4, 2016

(65) Prior Publication Data
US 2016/0264256 A1    Sep. 15, 2016

(30) Foreign Application Priority Data
Mar. 11, 2015 (FR) .................................... 15 00464

(51) Int. Cl.
*G01C 21/00* (2006.01)
*B64D 45/00* (2006.01)
*G05B 23/02* (2006.01)

(52) U.S. Cl.
CPC ......... *B64D 45/00* (2013.01); *G05B 23/0272* (2013.01)

(58) Field of Classification Search
CPC .... B64D 45/00; B64C 19/02; G05B 23/0272; G01C 23/00; G06F 11/07
USPC .................. 340/971, 945, 963; 701/3, 9, 14
See application file for complete search history.

(56) References Cited

U.S. PATENT DOCUMENTS

| | | | |
|---|---|---|---|
| 8,698,653 B2 * | 4/2014 | Rogers | G08G 5/0021 340/945 |
| 2006/0028012 A1 | 2/2006 | Holder et al. | |
| 2010/0161157 A1 | 6/2010 | Guilley et al. | |
| 2014/0200747 A1 | 7/2014 | Fezzazi et al. | |
| 2016/0107763 A1 * | 4/2016 | Giuliano | B64D 43/00 701/29.1 |

FOREIGN PATENT DOCUMENTS

WO    WO 95/26012 A1    2/1995

OTHER PUBLICATIONS

French Search Report of priority application.

* cited by examiner

*Primary Examiner* — Toan N Pham
(74) *Attorney, Agent, or Firm* — Davidson, Davidson & Kappel, LLC

(57) ABSTRACT

An assistance system for the implementation of aircraft procedures comprising a chain of operations to carry out is provided. The system includes a procedure database receiving the specifications of a plurality of procedures to be performed and a display and/or validation module which is able to collect the specifications of the procedure, to display a piece of characteristic information at least one operation of the procedure on the basis of the collected specifications, and/or to receive validation of the performance of at least one operation of the procedure. The system includes a conflict determination module which is able to generate for at least one operation of the procedure, feasibility information for the operation of the procedure during the course of the procedure, depending on the current operating states of the functional systems of the aircraft.

17 Claims, 3 Drawing Sheets

ASSISTANCE SYSTEM FOR THE IMPLEMENTATION OF AIRCRAFT PROCEDURES COMPRISING A CHAIN OF OPERATIONS TO CARRY OUT, AND RELATED PROCESS

The present invention relates to an assistance system for the implementation of aircraft procedures comprising a chain of operations, the system including:
- a procedure database hosting the specifications of a plurality of procedures to be performed depending on given operating states of functional systems of the aircraft;
- a display and/or validation module able to collect the specifications of the procedure from the procedure database and to display at least a piece of information which is characteristic of at least one operation of the procedure on the basis of the collected specifications, and/or to receive a validation of the performance of at least one operation of the procedure.

Such a system is intended for use in a cockpit of an aircraft, in order to lighten the workload of the crew during the performance of the procedures required during the movement of the aircraft. In some cases, the system may overcome the lack of a crew member. On the ground, it may also be implemented by a maintenance operator from the cockpit or remotely from the aircraft.

BACKGROUND

The procedures are, for example, procedures to be carried out before a flight, to check proper operation of the various systems of the aircraft, navigation procedures to be implemented during flight, for example when changing a flight phase, or malfunction procedures to be implemented in the event of failures of one or more pieces of aircraft equipment.

Generally each procedure involves a series of operations defined by the manufacturer and/or the operator, and which are generally validated by certification authorities. These procedures are linked in the form of lists.

The operations are, for example, actions to be performed, such as commands intended for an airplane system, with acknowledgement of their application, questions to the crew requiring a simple response, or requests for crew actions. Other operations are purely for information, such as sending messages and/or information to the crew without a response being expected.

When a procedure is implemented during flight, the crew performs the actions required by actuating the controls positioned in the cockpit, either directly by means of switches or through computers and software controlled by the crew.

In traditional flight with a crew of two, the first member of the crew takes care of the short-term flight and a second crew member successively performs the various actions of the procedure under the control of the first crew member for major or irreversible actions, such as an engine failure, extinction of a fire . . . .

The procedures are generally listed in one or more aircraft operating manuals which are available in paper form or electronically. A large number of procedures are certified and must be strictly applied by the crew, especially in the event of malfunctions.

On modern aircraft, the procedures are stored as computer files in a database and may be displayed on a screen in the cockpit when they have to be implemented.

Generally, the operations of the procedure are successively displayed by a display and validation module, wherein the crew must validate the actions as they are gradually performed.

In some cases, especially in the event of multiple malfunctions on the aircraft, several different procedures must be implemented one after the other.

Generally, the crew determines the order of performing of the procedures by determining which are the most critical. Then, the crew successively executes the various procedures to be implemented by carrying out the provided actions of each procedure one by one.

Furthermore, for safety reasons, particularly in the context of multiple malfunctions, the crew must continually analyze whether the action to be performed of a specific procedure is appropriate with respect to the current operational state of the aircraft. In particular, if the action to be performed might result in a change of state of a piece of equipment of the aircraft, this change of state might affect the appropriate flying of the aircraft, or even the safety of the flight depending on the elements affected by other procedures or by other malfunctions.

By the term <<change of state>> of a piece of equipment, is meant the change from a state of power on to a state of power off or vice versa, the change from an operational state to a state of malfunction, the change of an equipment control mode, or even any change in the positioning of a piece of equipment to a state which is distinctly different from the previous state (e.g. a slat or flap position, or raising/lowering the landing gear).

The crew workload is thus very high, insofar that the crew has to keep the aircraft in flight while carrying out a large number of actions relating to procedures, determining the preferential order for performing the procedures, and the impact of each action of a procedure on the course of the flight.

SUMMARY OF THE INVENTION

An object of the invention is thus to provide an assistance system for the implementation of aircraft procedures comprising a chain of operations to be performed, wherein the system simplifies the work of the crew and reduces their workload, while ensuring the safety of the flight.

To this end, the invention provides a system of the aforementioned type, characterized in that the system includes a conflict determination module which is able to generate, for at least one operation of the procedure, a piece of feasibility information of the operation of the procedure during the course of the procedure, on the basis of current operating states of the functional systems of the aircraft, the conflict determination module being able to transmit the determined piece of feasibility information to the display and/or validation module.

The system according to the invention may comprise one or more of the following features individually or in any technically possible combination:
- the operations to be performed include a plurality of actions to be performed, wherein the conflict determination module is able to generate, for at least one action of the procedure to be performed, advantageously for each action of the procedure to be performed successively, a piece of feasibility information for the action of the procedure to be performed during the course of the procedure, based on current operating states of the functional systems of the aircraft, wherein the conflict determination module is able to transmit the determined piece of feasibility information to the display and/or validation module.

the piece of feasibility information is selected from among at least a piece of compatibility information, enabling the performance of the operation of the procedure, and at least a piece of conflict information enabling prevention of the performance of the operation of the procedure, the display and/or validation module being able to signal the receipt of a piece of conflicting information coming from the conflict determination module.

the conflict determination module includes a conflict identification database defining a list of conflicting operations, depending on given operating states of the functional systems of the aircraft, the conflict determination module being able to receive information representative of current operating states of the functional systems of the aircraft, to extract the conflicting operations corresponding to the current operating states from the conflict identification database and to generate a piece of conflict information if the operation of the ongoing procedure is a conflicting operation corresponding to the current operating states.

the list of conflicting operations comprises at least one operation resulting in a change of state of a first piece of aircraft equipment which is incompatible with the operating states and/or current malfunction states of at least a second redundant piece of equipment with the first piece of equipment.

the system as defined above, comprises an automatic execution module of at least one operation of the procedure, the automatic execution module being able to automatically generate a command for performing at least one operation of the procedure, the conflict determination module being able to transmit the performing command generated by the automatic execution module when the generated piece of feasibility information is a piece of compatibility information and is able to block the command of the operation of the procedure when the generated piece of feasibility information is a piece of conflict information.

the automatic execution module is able to receive information representative of the current operating states of the functional systems of the aircraft and to determine the following operation to be performed during the course of a procedure on the basis of the current operating states, depending on the specifications contained in the procedure database, preferably by selecting the following operation from a plurality of possible sequences of operations as a function of the given operating states.

the automatic execution module is able to request and obtain a validation from a user, before generating a command for performing of at least one operation of the procedure.

the automatic execution module is able to automatically verify the execution of an operation of the procedure.

the system as defined above, comprises a procedure monitoring module which is able to receive information representative of the current operating states of the functional systems of the aircraft, and to determine, from the procedure database, at least one procedure to be performed based on the current operating states, and to enable the display and/or validation module for the implementation of said or each procedure to be executed.

the monitoring module is able to determine a plurality of procedures to be performed in given operating states, and to define an order for performing the procedures from among the plurality of procedures to be performed, depending on the current operating states, and on priority definitions among the procedures contained in the procedure database.

the system comprises at least one data acquisition module for data coming from the functional systems of the aircraft, the data acquisition module being able to generate information that is representative of the current operating states of the functional systems of the aircraft.

the operations within each procedure are selected from among the actions to be performed such as analysis of a state of a device, a command to a system, with possible confirmation of the command having been performed, a question to the user with possible awaiting of a simple answer, a request for user action, a monitoring of user actions, a selection from among several possible sequences of operations, an acknowledgement of a piece of information by the user, or informative operations such as displaying a message and/or a parameter related to the procedure without validation by the user.

at least one procedure is a procedure for handling a malfunction or failure during a flight or on the ground, a navigation procedure during a flight, or a verification procedure during a flight or on the ground, or an aircraft configuration management procedure during a flight or on the ground.

The invention also provides an assistance method during at least one given aircraft procedure comprising a chain of operations to be performed, the method comprising the following steps:

enabling of a system as defined above for implementing the procedure;

collecting specifications of the procedure in the procedure database;

displaying by the display and/or validation module of at least one piece of characteristic information of at least one operation of the procedure on the basis of the collected specifications, generating for at least one operation of the procedure, feasibility information for the operation of the procedure during the course of the procedure by the conflict determination module, on the basis of information which is representative of the current operating states of the functional systems of the aircraft, transmitting the determined piece of feasibility information to the display and/or validation module.

The method of the invention may comprise one or more of the following features individually or in any technically possible combination:

the system comprises an automatic execution module of at least one operation of the procedure, the method comprising the following steps:

automatic generation by the automatic execution module of a command to perform at least one operation to be performed of the procedure;

transmission by the conflict determination module of the command to perform generated by the automatic execution module when the piece of feasibility information generated is a piece of compatibility information;

blocking by the conflict determination module of the command of the operation to be performed when the piece of feasibility information generated is a piece of conflict information.

BRIEF SUMMARY OF THE DRAWINGS

The invention will be better understood on reading the description which follows and which is given by way of example with reference to the appended drawings, wherein.

DETAILED DESCRIPTION

Figure 1:
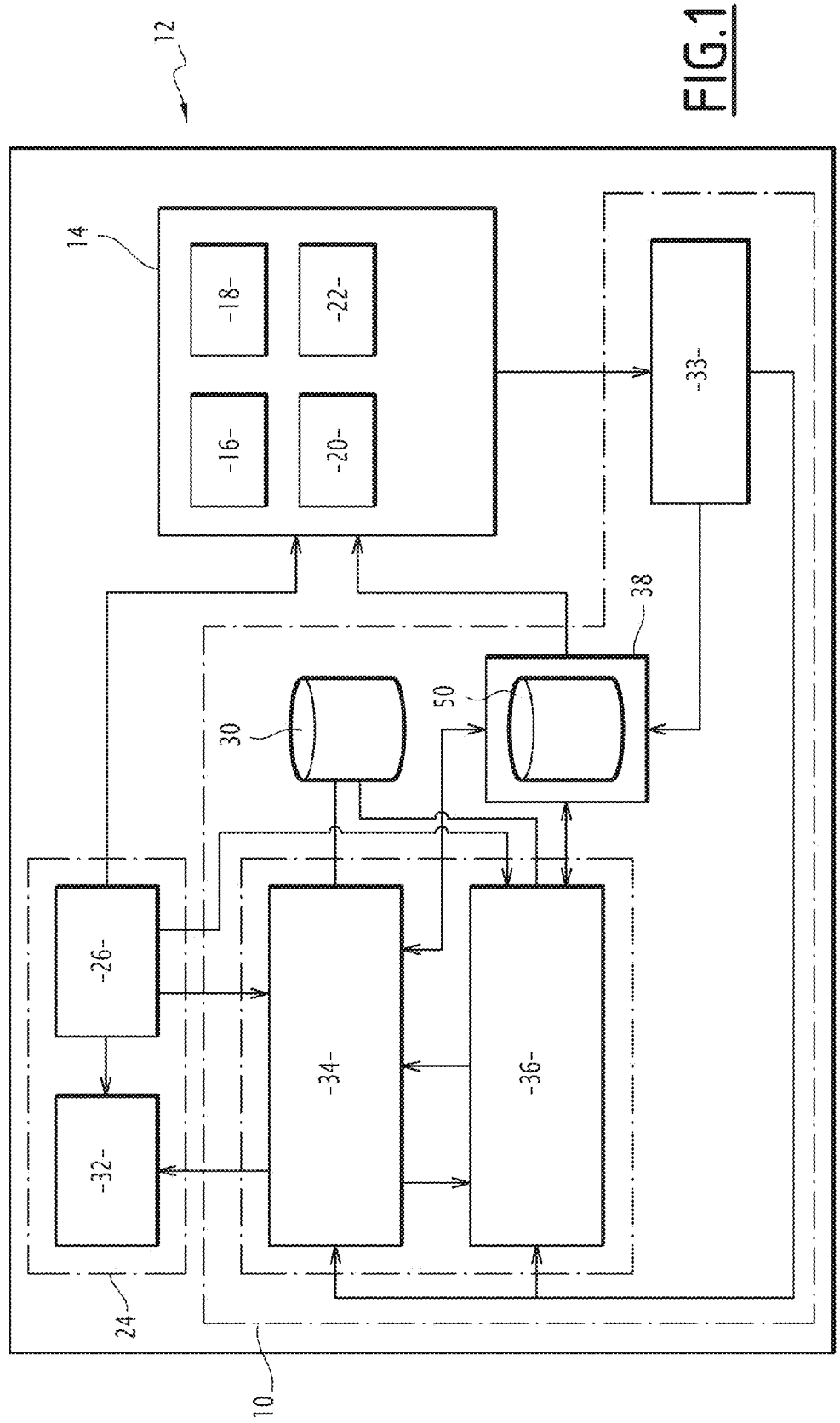
FIG. 1 shows a schematic view of an aircraft, provided with a first assistance system according to an embodiment the invention.

A first system 10 for assisting the crew of an aircraft 12 according to an embodiment of the invention is schematically illustrated in FIG. 1.

The system 10 is intended to help the crew implement procedures including a chain of operations to be performed, relating to functional systems 14 of the aircraft 12.

The functional systems 14 comprise, for example, one or more hydraulic systems 16, one or more electrical systems 18, and one or more propellant systems 20 of the aircraft 12 and/or one or more conditioning systems 22 of the cabin. This list may be extended to cover all the controlled systems of the aircraft.

Each functional system 14 includes equipment and components able to perform hydraulic, electrical, propulsion, or conditioning functions of the aircraft 12.

Conventionally an aircraft 12 includes a cockpit 24 occupied by the crew 12 of the aircraft. The cockpit 24 includes at least one panel provided with physical control elements or a control screen 26 for the functional systems 14 of the aircraft 12, which is able to implement controls of the functional systems 14 through physical switches or pieces of software operated by the crew, or through computers and pieces of software controlled by the crew.

A procedure consists of a chain of operations intended to be carried out depending on given operating states of the functional systems 14 of the aircraft 12.

Each procedure is, for example, implemented on the occurrence of a particular operational phase of the aircraft, such as taxiing, takeoff, passing through a given altitude, transition to cruise.

Other procedures are implemented on the occurrence of a malfunction or failure of a functional system 14 of the aircraft 12.

In this case, the procedure generally corresponds to a configuration or reconfiguration of one or more pieces of equipment of one or more functional systems 14 of the aircraft 12, by carrying out operations or a sequence of operations, according to the observed operating states of the functional systems 14.

The operations to be carried out advantageously comprise actions to perform such as an analysis of a state of a piece of equipment, a command intended for an aircraft system with confirmation of the execution of the command, a question to the crew, a request for crew action, monitoring of the actions of the crew, a selection from among several possible sequences of operations, acknowledgement of a piece of information by the user. Some operations of the procedure are informative for the crew without acknowledgement such as an informative display to the crew, for example the sending of an informative message to the crew or the display of one or more parameters relating to the procedure.

A command is able to be transmitted to an aircraft system. Examples of commands are the opening or closing of a valve, the control of electric switches . . . .

A command is generally followed in the procedure by a verification of its application.

A question to the crew is generally followed by awaiting a simple answer, for example, <<yes>> or <<no>>

A request for crew action is generally followed by awaiting action, which is determined by the effects of the action through sensors in the functional systems 14.

Monitoring a pilot action is sometimes followed by a confirmation when this action is likely to have significant consequences on the continuation of the flight.

The selection from among several possible sequences of operations is determined depending on value of representative information of operating states of the functional systems 14, for example, the state of a valve, the electrical voltages observed, or else the presence of a malfunction message.

The selection is expressed in the transition to a series of operations selected from among several possible sequences of operations provided in the procedure, depending on the current operating states of the aircraft, i.e. the operating states having just been measured.

A simple display to the crew is informative. It is not generally followed by any action.

Procedures are generally specified by detailing the sequential list of operations to be performed in the procedure. As previously mentioned, the procedure may comprise bifurcations, to allow different sequences of operations to be followed depending on current operating states of the functional systems 14, or on answers of the crew to questions posed through a displayer and/or validator in the form of a display and validation module 32.

The assistance system 10 according to an embodiment of the invention is implemented on one or more computers comprising at least a processor and a memory hosting the databases, as well as specific software modules able to be performed by the processor.

Referring to FIG. 1, the system 10 includes a procedure database 30, hosting the specifications of a plurality of procedures to be performed by the crew depending on given operating states of the functional systems 14 of the aircraft 12 and module 32 for the display and validation of successive operations to be performed in the course of each specific procedure.

The system 10 further includes data acquirer in the form of a module 33 for acquiring representative information of current operating states, and a procedure monitor in the form of a monitoring module 34 able to determine the procedures associated with the current operating states and/or follow the course of procedures implemented, depending on the current operating states.

The system 10 also includes an automatic executer in the form of a module 36 for automatic execution of at least part of the operations of the procedure, and a conflict determiner in the form of a conflict determination and safety module 38 able to generate, for each successive operation of the procedure, a piece of feasibility information of the operation of the procedure in the current operating states of the functional systems 14 of the aircraft 12.

The procedure database 30 comprises the description of the procedures in the form of characteristics of each of the operations which it contains, and the sequential order for performing such operations.

It further comprises, for procedures including a plurality of alternative sequences of operations, a definition of the operating states conditioning the passage to one or other of the sequences of operations.

The procedure database 30 further comprises a priority table allowing the definition of an order for performing the procedures when several procedures are to be performed simultaneously, depending on observed operating states of the functional systems 14 of the aircraft 12.

For example, the table comprises a list of possible sets of operating states likely to be observed, and for each set of operating states which may be observed, a list of associated procedures to be performed for this set of operating states. In addition, the table includes, for each procedure in the list of associated procedures, an indicator of the order for performing the procedures for all the procedures to be performed.

The display and validation module 32 is able to collect the specifications of a procedure given in the procedure database 30, to successively display a piece of information characteristic of each operation of the procedure obtained from the collected specifications on at least a control panel screen 26, and to receive, if necessary, an execution validation of the operation of the procedure by the crew or the automatic execution module 36.

The characteristic piece of information comprises, for example, a description of the operation to be performed, for example, an action to be performed, possibly accompanied by an indication of the degree of completion of the operation. Alternatively, the characteristic piece of information may comprise a warning message or a measured parameter, when the operation having taken place is purely informative.

Advantageously, the characteristic piece of information of a subsequent operation in the course of a procedure is only displayed when the execution validation of the previous operation in the procedure has been performed. Alternatively, the characteristic piece of information of a plurality of operations of the procedure to be performed are displayed simultaneously, and the display of each operation is changed depending on the state of performance of the operation.

The data acquisition module 33 is able to measure information which is representative of the current operating states of the various systems or functional equipment 14 of the aircraft, and to provide this information of operating states to the monitoring module 34, to the automatic execution module 36 and to the conflict determination module 38.

This representative information is, for example, sensor data available on the equipment and components of the functional systems. The data are representative of physical parameters such as temperature, position and/or equipment configurations such as the switching state of a valve, the voltage on a power grid, or a declared state of equipment malfunction.

Conventionally, the data acquisition module 33 is able to obtain data from redundant sensors, and to operate in a multi-instantiated manner, with outputs polled to guarantee data reliability.

The monitoring module 34 is able to receive continuous data from the data acquisition module 33, which are representative of the current operating states of the various functional systems of the aircraft 14.

It is able to query the priority table of the procedure database 30, in order to determine whether the current operating states correspond to a set of possible operating states in the list of sets of possible operating states, to extract the procedure(s) associated with these possible operating states and, where appropriate, the order for performing the associated procedures.

The monitoring module 34 is thus able to establish and transmit to the display and validation module 32 the list of the procedure(s) to be launched when current operating states are measured by the module 33, and to provide the crew, where appropriate, with the preferential order for performing the procedures, depending on the data available in the priority table of the procedure database 30.

The monitoring module 34 is further able to enable the automatic execution module 36, on the basis of acknowledgement of consent by the crew received from the control panel 26, so as to successively perform the operations of each procedure in the list of procedures to be launched.

The monitoring module 34 is able to transmit information on the ongoing procedure to the conflict determination module 38.

For each procedure performed, the automatic execution module 36 is able to load into the database 30, the list of the operations of the procedure to be performed and to receive data from the data acquisition module 33 in order to determine the current operating states of the various functional systems 14 of the aircraft 12.

The automatic execution module 36 is able to automatically determine the commands to be performed depending on the current operating states from the data acquisition module 33.

It is able to send, via the conflict determination module 38, the commands to be performed on the functional systems 14, and optionally measure the effects of commands sent on the observed operating states.

The automatic execution module 36 is able to switch from an already performed operation to the next operation to be performed in the procedure depending on the observed operating conditions and on optional intervention by the crew following a question or an override.

For certain operations, predefined as <<without validation>> in the procedure, the automatic execution module 36 is able to send commands to the functional systems 14 via the conflict determination module 38 without validation by the crew.

For other operations, predefined as <<with validation>> in the procedure, the conflict determination module 38, is able to query the crew via the monitoring module 34 in order to obtain an order for performing the operation, and then, once the order for performing the operation is obtained, to send commands to the functional systems 14.

The automatic execution module 36 may be disabled from the control panel 26 by the crew at any time in order to prevent the automatic execution of a command by the automatic execution module 36 or, conversely, to force the performance of an operation specifically blocked by the conflict determination module 38.

When the procedure comprises alternative sequences of operations, the automatic execution module 36 is able to compare the current operating states coming from the data acquisition module 33 against predefined operating states for each of the following alternative operations in the procedure database 30 in order to determine the specific sequence of operations to be performed with the current operating states from among all possible sequences of operations.

The automatic execution module 36 is possibly able to query the crew in order to obtain a validation of the sequence of alternative operations selected depending on the current operating states.

The conflict determination module 38 is able to generate, for each successive performance of an ongoing procedure, a piece of feasibility information for the operation to be performed in the procedure depending on the current operating states of the functional systems 14 of the aircraft 12, and for the completion of the ongoing procedure provided by the module 34. The module 38 is then able to transmit the determined piece of feasibility information to the display and validation module 32 and, advantageously, to the monitoring module 34 and the automatic execution module 36 and, if necessary, to block the command transmitted by the automatic execution module 36.

The piece of feasibility information is either a piece of compatibility information, giving the possibility of performing the operation of the procedure, or a piece of conflict information capable of blocking the performance of the operation of the procedure.

If the piece of feasibility information is a piece of compatibility information, the conflict determination module 38 is able to transmit the command from the automatic execution module 36 to the systems 14 of the aircraft, with or without validation by the pilot.

An operation may be regarded as generating conflict if it involves, for example, non-compliance with a safety requirement with respect to the operation of the aircraft 12 or non-compliance with a constraint related to the mission such as, for example, a comfort criterion, a restriction on the usage of the aircraft 12 in order to limit damage or the following of a flight plan.

To this end, the conflict determination module 38 includes a conflict identification database 50.

The conflict identification database 50 includes at least one incompatibility table defining a list of conflicting operations in the presence of a set of predefined operating states of the functional systems 14 of the aircraft 12.

For example, the incompatibility table includes a list of possible sets of operating conditions, likely to be observed and for each set of possible operating states, an associated list of incompatible conflicting operations for this set of operating states.

Advantageously, the list of conflicting operations comprises at least one operation causing a change of state of a first piece of aircraft equipment which is incompatible with the current operating and/or malfunctioning states of at least one second piece of equipment redundant with said first piece of equipment.

For example, in the case of a twin-engine aircraft, a stop command operation of the second engine of the aircraft 12 is identified as a conflicting operation when the observed operating states indicate a malfunction and/or the stopping of the first engine of the aircraft. Similarly, the shutting down of a pump supplying a hydraulic network is identified as a conflicting operation when another hydraulic network is already shut down.

For each operation to be performed in a procedure, the conflict determination module 38 is thus able to receive representative information of the current operating states, coming from the data acquisition module 33, and to identify the conflicting operations corresponding to the observed operating states from the incompatibility table of the conflict identification database 50.

The conflict determination module 38 is able to generate the piece of feasibility information of the operation of the procedure during the course of the procedure, based on current operating states of the functional systems 14 of the aircraft 12.

This piece of feasibility information is a piece of conflict information if the operation to be performed in the procedure is a conflicting operation in the current operating states. However, the piece of feasibility information is a piece of compatibility information if the operation to be performed in the procedure is not a conflicting operation in the current operating states.

When a piece of conflict information is transmitted to the display and validation module 32, the module 32 is able to warn the crew, for example by identifying on the display of the control panel 26, that the operation to be performed is conflicting by a specific marking.

This particular display consists, for example, of displaying the conflicting operation to be performed differently from a compatible operation to be performed, for example with a different colour, and/or a special background band, and/or with a display effect, such as a flashing display. Alternatively or additionally, a sound message or an alarm is triggered by the display and validation module 32.

When a piece of conflict information is detected by the conflict determination module 38, the latter is able to prevent the automatic performance of the operation to be performed, and the crew must then take control in order to either perform the operation or not.

The databases 30 and 50 are parameterizable in order to define and update the data of the operations to be performed in each procedure, and also to define and update the priority table and/or incompatibility table. The parameterization may be carried out from the ground facilities, especially during a maintenance operation on the aircraft 12.

Figure 2:
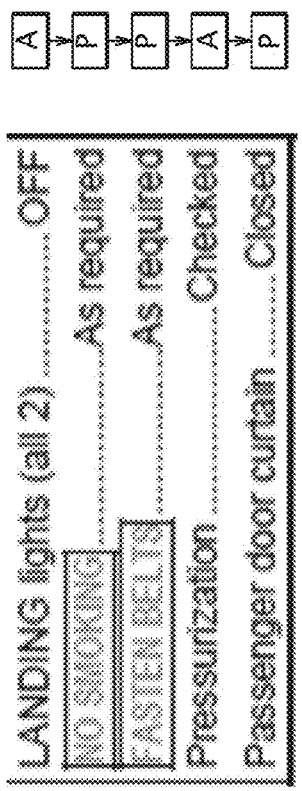
FIG. 2 shows a first window displayed by means of the display and validation module during the implementation of a first procedure by means of the assistance system.
Figure 4:
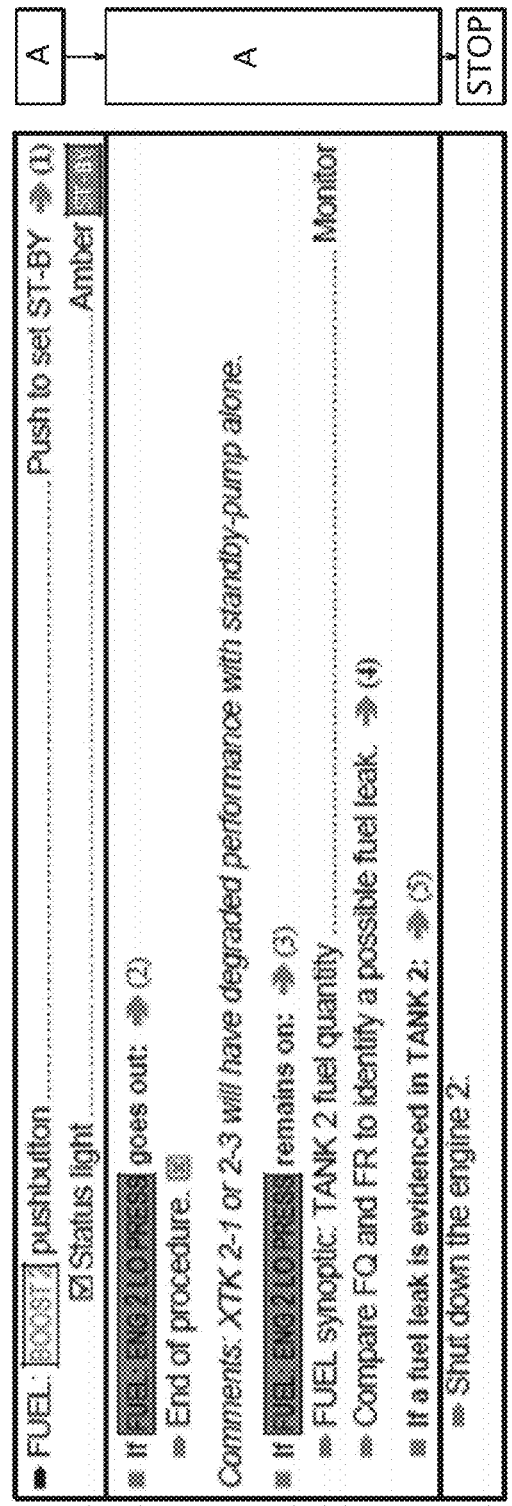
FIG. 4 shows a third window displayed by means of the display and validation module during the implementation of a third procedure by means of the assistance system.
Figure 3:
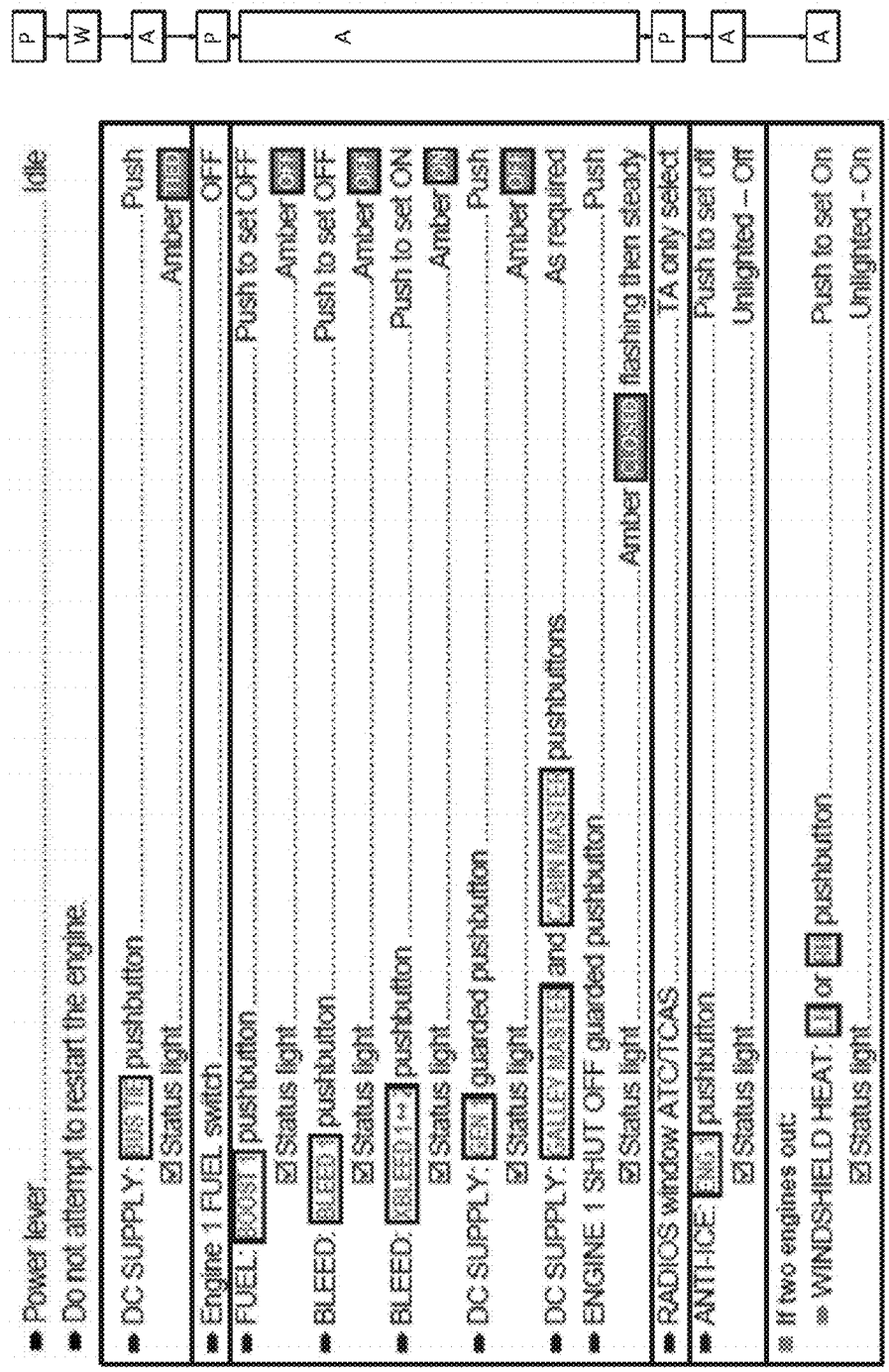
FIG. 3 shows a second window displayed by means of the display and validation module during the implementation of a second procedure with the assistance system.

An example of a assistance method for the crew using the system 10, will now be described in the context of the performance of three successive procedures as illustrated in FIGS. 2 to 4.

Initially, the twin-engine aircraft 12 takes off. The assistance system 10 is enabled by the crew. The data acquisition module 33 continuously queries the sensors present in the various functional systems 14 of the aircraft in order to obtain information representative of the operating states of the functional systems 14.

The information representative of the operating states is continuously transmitted to the monitoring module 34.

The monitoring module 34 continuously queries the procedure database 30 in order to determine whether the current operating states received from the data acquisition module 33 are predefined operating states corresponding to one or more procedures listed in the priority table.

When the current operating states correspond to at least one procedure listed in the priority table, the monitoring module 34 transmits the piece of information to the display and validation module 32, which suggests to the crew the implementation of the procedure(s) corresponding to the current operating states in the order defined in the priority table.

For example, when the data acquisition module 33 detects that the flight level 100, corresponding to passing to an altitude of 10,000 feet is reached, and no malfunction has been observed on the functional systems 14, the monitoring module 34 determines that the normal procedure "CLIMB" may be enabled. It thus transmits this piece of information to the display and validation module 32 which suggests to the crew performing the operations of this procedure.

Upon crew acknowledgement, the display and validation module 32 retrieves the information relating to the operations to be performed in the procedure from the procedure database 30, and displays it on a screen of the control panel 26, as shown in FIG. 2.

The monitoring module 34 then enables the automatic execution module 36 to allow subsequent automatic performance of the various operations in the procedure.

The automatic execution module 36 then loads into the database 30, the list of operations to be performed for the procedure.

For each successive operation, the automatic execution module 36 determines whether the operation should be performed depending on the operating states of the functional systems 14 received from the data acquisition module 33.

The automatic execution module 36 moreover determines whether the operation is an operation without validation by the crew (marked "A" in FIG. 2), an operation requiring validation by the crew (marked "P" in FIG. 2) or a simple warning to the pilot (marked "W" in FIG. 3).

In the case of an operation without any validation, or after having obtained consent of the crew in the case of an operation with validation, the automatic execution module 34 sends a command to perform the operation. When this is done, the module 34 verifies the effects of the command on the basis of the operating states of the functional systems 14, following execution of the command.

In the case of the procedure described in FIG. 2, the first step is to switch off the landing lights (<<landing lights>> in FIG. 2). The automatic execution module 36 sends a command to switch off these lights without validation by the crew.

The automatic execution module 36 then verifies that the lights have been switched off and then passes on to the next operation.

The following operation is to keep on or switch off the <<no smoking>> sign (<<no smoking>> in FIG. 2) in the cabin. This requires a choice by the crew. The automatic execution module 36 therefore asks the crew on the control panel 26 to choose between keeping on or switching off this sign.

If the crew chooses to switch off the sign, the automatic execution module 36 sends a command to switch off the sign, and checks that the command has been performed before proceeding to the following operation, which is similar by keeping on or switching off the sign <<fasten your seatbelts>> in the cabin (<<fasten belts>> in FIG. 2).

Then the automatic execution module 36 detects that the following operation is to check the cabin pressurization (<<pressurization>> in FIG. 2) and that this operation can be performed without validation by the crew.

The automatic execution module 36 analyzes the information representative of the operating states of the functional systems 14, especially the pressure in the cabin air conditioning system, and automatically determines whether the pressurization is adequate by comparing the pressure observed with a range of predefined normal pressures. If the pressure is adequate, the automatic execution module 36 performs the following operations defined in the procedure until the end of the procedure.

For each operation to be performed, the conflict determination module 38 generates a piece of feasibility information for the operation, depending on the current operating states of the functional systems 14 received from the data acquisition module 33. This piece of information is either a piece of compatibility information which allows the operation to be performed, or a piece of conflict information which blocks the performance of the operation.

The monitoring module 34 also continuously checks that the current operating states of the functional systems 14 do not require the implementation of another procedure in place of the one currently being executed.

In this example, at a given moment during the course of the <<CLIMB>> procedure, the <<full authority>> digital control system of the first engine of the aircraft triggers an automatic shutdown of the engine.

The monitoring module 34 detects the shutdown of the first engine from among the current operating states raised by the data acquisition module 33.

It queries the database 30 and determines from the priority table that the procedure <<ENG1: AUTO SHUTDOWN>> corresponding to the automatic shutdown of the first engine must be implemented, in priority with respect to the <<CLIMB>> procedure which must be interrupted.

The monitoring module 34 thus stops the performance of the <<CLIMB>> "CLIMB" by the automatic execution module 36. Upon the command from the crew, it then enables the automatic execution module 36 to perform the procedure <<ENG1: AUTO SHUTDOWN>> whose successive operations are shown in FIG. 3.

This procedure begins with a pilot operation request (<<power lever Idle>>) in order to bring the corresponding power lever to the engine idle position.

The automatic execution module 36 checks that the pilot has done this before proceeding to the following operation which is to warn the pilot not to attempt to restart the engine (<<Do not attempt to restart the engine>>).

Then the automatic execution module 36 performs the various successive operations of the procedure, some of which may be performed automatically, while others require validation by the crew, as described above.

During the course of this procedure, the data acquisition module 33 delivers information about a low level of pressure on the fuel supply line of the second engine.

The monitoring module 34 queries the database 30, and determines from the priority table that the procedure <<FUEL: ENG2 LO PRESS>> must be performed after the end of the procedure <<ENG1: AUTO SHUTDOWN>>.

When the procedure <<ENG1: AUTO SHUTDOWN>> is over, and following validation by the crew, the automatic execution module 36 begins the procedure <<FUEL: ENG2 LO PRESS>>, whose operations are shown in FIG. 4.

The first operation of the procedure is a fuel pump enabling command <<BOOST2 ST-BY>> (power on) that is effected automatically by the automatic execution module 36, which checks that it has indeed been performed after sending the command.

Then two possible sequences of operations may be carried out, depending on the operating states of the functional systems 14 of the aircraft, especially with respect to stopping or maintaining an indication of low pressure (FUEL: ENG2 LO PRESS) on the second engine fuel supply line, following performance of the previous operation.

The automatic execution module 36 determines what sequence of operations has to be performed depending on the current operating states raised by the data acquisition module 33.

In this case, as the indication of low pressure in the second engine remains present, the automatic execution module 36 determines that the second sequence of operations has to be performed.

The automatic execution module 36 determines the quantity of fuel in the second tank (<<Tank 2 fuel quantity:

Monitor>>) and compares this quantity with a quantity calculated to identify a potential fuel leak.

Based on this calculation, the automatic execution module 36 confirms the occurrence of a fuel leak. In this case, the next operation to be performed in the procedure normally involves shutting down the second engine.

However, the conflict determination module 38 determines from the current operating states of the functional systems 14 that the first engine has already been shut down. From the compatibility table, the conflict determination module 38 develops a piece of conflict information indicating that the operation of shutting down the second engine is incompatible with the current operating states.

The module 38 therefore blocks the performance of the command to shut down the second engine.

The piece of conflict information is transmitted to the display and validation module 32 to inform the crew of this incompatibility, for example by a particular indication, by displaying the operation to be performed with a different color or with a special background band, or with a visual cue, such as flashing. An audible or visual alarm may be triggered if necessary.

The piece of conflict information is also transmitted to the monitoring module 34 which disables the automatic execution module 36.

The crew takes over manual control of the performance of the procedures depending on the operational situation.

The crew assistance system 10 thus greatly simplifies the task of the crew by serving as a second pilot thanks to the presence of a monitoring module 34 which continuously determines the appropriate procedures to be performed at any moment, and prioritizes these procedures based on the current functioning states of the functional systems 14 of the aircraft 12.

For each procedure, the crew assistance system 10 is able to display in a synthetic manner the various operations to be performed, and the state of performance of each operation through a display and validation module 32.

The automatic execution module 36 of the crew assistance system 10 is further able to enable the automatic or semi-automatic performance of successive operations of a procedure, especially directly generating commands, without the intervention of the crew, or, in some cases, after validation by the crew. The automatic execution module 36 is able to verify that these commands have been carried out, based on the current operating states of the functional systems 14.

The conflict determination module 38 of the crew assistance system 10 is able to signal to the crew at any time whether an operation to be performed, particularly coming from the automatic execution module 36, is incompatible with the current operating states of the functional systems 14 and if necessary block the command for performing this operation. This guides the crew when it is manually running the procedures and ensures safety in the case where the procedures are automatically or semi-automatically run by the automatic execution module 36.

The system 10 greatly simplifies the conduct of the flight and gives the possibility, in some cases, of overcoming the lack of a crew member. In addition, the safety of the conduct of the flight is maintained, since the crew operations are monitored and validated continuously by the crew assistance system 10, especially when these operations are inalienable or irreversible.

However, the crew remains master of the assistance system 10 at all times, and can take over the commands of the system 10 through traditional commands at the control panel 26.

Alternatively, the assistance system 10 may be implemented by a maintenance operator to perform at least one procedure. The implementation takes place either in the aircraft, especially the cockpit, or on the ground at a distance from the aircraft.

Alternatively, the module 32 may be simply a display module able to receive a piece of acknowledgement information of the performance of the validation.

Nevertheless, the conflict determination module 38 remains enabled and passes on the piece of feasibility information to the display module 32.

What is claimed is:

1. An assistance system for implementation of aircraft procedures comprising a chain of operations to be performed, the system comprising:
    a procedure database hosting specifications of a plurality of procedures to be performed depending on given operating states of functional systems of the aircraft;
    a displayer and/or validator configured to collect the specifications of a procedure from the procedure database and to display at least a piece of information which is characteristic of at least one operation of the procedure based on the collected specifications, and/or to receive a validation of performance of at least one operation of the procedure;
    a conflict determiner configured to generate, for at least one operation of the procedure, a piece of feasibility information of the operation of the procedure during course of the procedure, based on current operating states of the functional systems of the aircraft, the conflict determiner being configured to transmit the generated piece of feasibility information to the displayer and/or validator.

2. The system as recited in claim 1 wherein the piece of feasibility information is selected from among at least a piece of compatibility information, enabling the performance of the operation of the procedure, and at least a piece of conflict information enabling prevention of the performance of the operation of the procedure, the displayer and/or validator being configured to signal receipt of a piece of conflicting information coming from the conflict determiner.

3. The system as recited in claim 1 wherein the conflict determiner includes a conflict identification database defining a list of conflicting operations, depending on given operating states of the functional systems of the aircraft, the conflict determiner being configured to receive information representative of current operating states of the functional systems of the aircraft, to extract the conflicting operations corresponding to the current operating states from the conflict identification database and to generate a piece of conflict information if the operation of an ongoing procedure is a conflicting operation corresponding to the current operating states.

4. The system as recited in claim 3 wherein the list of conflicting operations comprises at least one operation resulting in a change of state of a first piece of aircraft equipment which is incompatible with the operating states and/or current malfunction states of at least a second redundant piece of equipment with the first piece of equipment.

5. The system as recited in claim 1 further comprising an automatic executer of at least one operation of the procedure, the automatic executer being configured to automatically generate a command for performing at least one operation of the procedure, the conflict determiner being configured to transmit the command generated by the automatic executer when the generated piece of feasibility information is a piece of compatibility information and is configured to block the command generated by the automatic executer when the generated piece of feasibility information is a piece of conflict information.

6. The system as recited in claim 5 wherein the automatic executer is configured to receive information representative of the current operating states of the functional systems of the aircraft and to determine a following operation to be performed during course of a procedure on the basis of the current operating states, depending on the specifications contained in the procedure database.

7. The system as recited in claim 6 wherein the automatic executer is configured to determine the following operation to be performed during the course of a procedure by selecting the following operation from a plurality of possible sequences of operations as a function of given operating states.

8. The system as recited in claim 5 wherein the automatic executer is configured to request and obtain a validation from a user, before generating a command for performing of at least one operation of the procedure.

9. The system as recited in claim 5 wherein the automatic executer is configured to automatically verify execution of an operation of the procedure.

10. The system as recited in claim 1 further comprising a procedure monitor which is configured to receive information representative of the current operating states of the functional systems of the aircraft, and to determine, from the procedure database, at least one procedure to be performed based on the current operating states, and to enable the displayer and/or validator for the implementation of the at least one procedure to be performed.

11. The system as recited in claim 10 wherein the procedure monitor is configured to determine a plurality of procedures to be performed in given operating states, and to define an order for performing the procedures from among the plurality of procedures to be performed, depending on the current operating states, and on priority definitions among the procedures contained in the procedure database.

12. The system as recited in claim 1 further comprising at least one data acquirer for acquiring data coming from the functional systems of the aircraft, the data acquirer being configured to generate information that is representative of the current operating states of the functional systems of the aircraft.

13. The system as recited in claim 1 wherein the operations within each procedure are selected from among an analysis of a state of a device, a command to a system, with possible confirmation of the command having been performed, a question to the user with possible awaiting of a simple answer, a request for user action, a monitoring of user actions, a selection from among several possible sequences of operations, an acknowledgement of a piece of information by a user, or informative operations.

14. The system as recited in claim 13 wherein the informative operations include displaying a message and/or a parameter related to the procedure without validation by the user.

15. The system as recited in claim 1 wherein at least one procedure is a procedure for handling a malfunction or failure during a flight or on a ground, a navigation procedure during a flight, or a verification procedure during a flight or on the ground, or an aircraft configuration management procedure during a flight or on the ground.

16. An assistance method during a given aircraft procedure comprising a chain of operations to be performed, the method comprising:
enabling the system as recited in claim 1 for implementing the procedure; collecting specifications of the procedure in the procedure database;
displaying by the displayer and/or validator of at least one piece of characteristic information of at least one operation of the procedure on the basis of the collected specifications;
generating for at least one operation of the procedure, a piece of feasibility information for the operation of the procedure during the course of the procedure by the conflict determiner, based on information which is representative of the current operating states of the functional systems of the aircraft; and
transmitting the generated piece of feasibility information to the displayer and/or validator.

17. The method as recited in claim 16 wherein the system comprises an automatic executer of at least one operation of the procedure, the method comprising:
automatically generating by the automatic executer a command to perform at least one operation to be performed of the procedure;
transmitting by the conflict determiner the command to perform generated by the automatic executer when the generated piece of feasibility information is a piece of compatibility information; and
blocking by the conflict determiner the command of the operation to be performed when the generated piece of feasibility information is a piece of conflict information.

* * * * *